March 29, 1932.    O. BECKER    1,851,080
SAFETY BELT
Filed Sept. 20, 1930
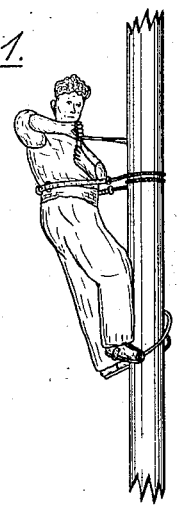
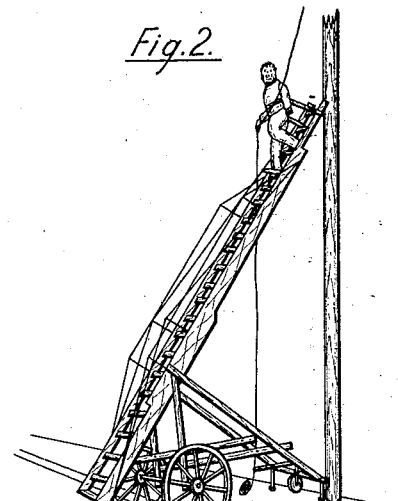
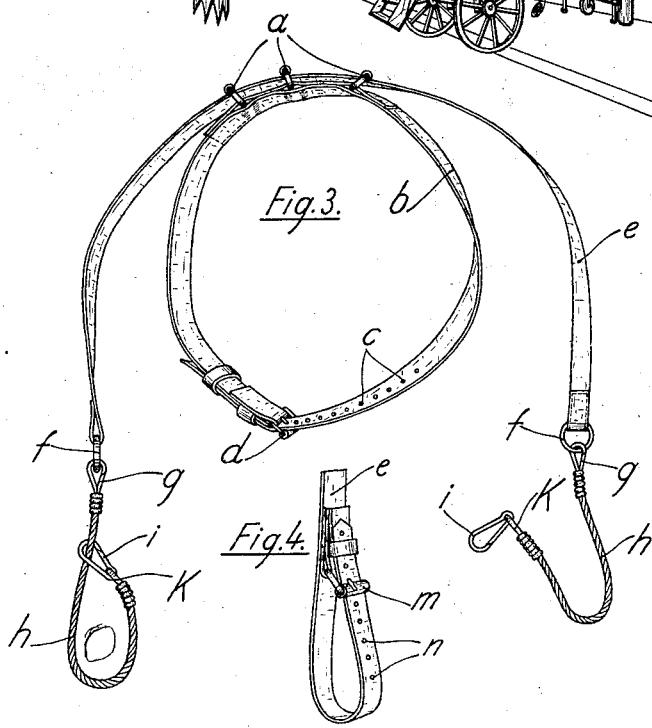

Patented Mar. 29, 1932

1,851,080

UNITED STATES PATENT OFFICE

OTTO BECKER, OF ZUFFENHAUSEN, GERMANY

SAFETY BELT

Application filed September 20, 1930, Serial No. 483,361, and in Germany July 23, 1930.

This invention relates to a safety belt for the purpose of protecting hand-workers such as telegraph workers, fitters, plumbers, painters, masons and the like, against falling or slipping off telephone poles or falling from ladders, and for giving them both hands free for working and great freedom of movement. The safety belts hitherto in use consist of a belt, on the left side of which the safety rope is fastened in a ring with a spring hook which is hooked into a ring on the right side of the belt after the rope has been passed around the pole.

These belts were open to various objections: through the pulling force acting on the belt lateral pressure effects were exerted on the stomach, which in the case of long work was injurious to health; the body swayed backwards and forwards, so that the necessary hold when working was lost and the feeling of safety was impaired. On the pull decreasing the safety rope dropped, which, in the event of the climbing irons failing, resulted in slipping down. In the case of iced poles in winter the known belt offered but little hold.

The safety belt according to the invention consists only of a belt which is strapped around the body and of a running belt movable therein in eyes on the rear side, the ends of which running belt carry safety ropes with spring hooks. With the aid of these ropes and spring hooks, loops can be wound around the pole, which loops tighten under the load. The body thus has a good hold, maximum freedom of movement, and as the pressure is uniformly distributed over the back, the stomach being free, a convenient working position is possible without injury to health. Slipping down is impossible, as the loops automatically tighten under the load, and the danger of falling is prevented on account of the double security. The safety belt can be used in a similar manner for working on a portable or stationary ladder, as the loops are laid around both rungs. For easy work on ladders the rope ends may be omitted and the ends of the belt so constructed, that loops can be formed around the rungs with the aid of buckles.

An embodiment of the invention is illustrated by way of example in the accompanying drawings in which Fig. 1 shows the manner of fastening the belt on a pole.

Fig. 2 shows the manner of wearing the belt on ladders.

Fig. 3 is a perspective view of the belt.

Fig. 4 is a perspective of a belt of light construction.

The safety belt consists of a belt $b$ rigidly connected with eyes $a$, which belt is provided with apertures $c$ for fixing the belt buckle $d$.

A running belt $e$ is loosely mounted in the three eyes shown, in the ends of which running belt, provided with rings $f$, safety ropes $h$ are suspended with the aid of rope eyes $g$, which ropes carry spring hooks $i$ on their free ends in rope eyes $k$.

In the construction illustrated in Fig. 4 the ropes are omitted, so that the ends of the slightly longer running belt $e$ can be wound in loops with the aid of buckles $m$ and holes $n$.

The manner of operation is as follows:—

If the worker has to go into the dangerous position illustrated in Fig. 1, he first straps the belt $b$ around his body and can then climb the pole, when he can secure himself by hooking, for example, the right spring hook $i$ into the left safety ring $f$. When he has reached the place of work, he wraps the left rope, which is still hanging, around the pole and forms a loop, as shown on the left side of Fig. 3, with the aid of the spring hook $i$, which is snapped over the rope $h$, after the rope $h$ has been passed around the pole. After this he can unhook the hook $i$ of the right hand rope $h$ from the left hand ring $f$ and also form a loop with this rope around the pole, snapping this spring hook $i$ over the rope $h$ appertaining to the hook $i$. The two loops pull tight under the tension produced by the weight of the body. The worker can carry out his work without danger and work with both hands in the most convenient manner. A slipping down in the case of the climbing irons failing is impossible, as the loops pull so tightly around the pole under the weight of the body that, owing to the friction, no downward movement can occur, even in the case of ice coated poles, and the worker remains hanging freely in the belt. It is also impossible for the worker to fall in the case of breakage of a rope or spring hook, as the safety ring $f$ catches in the eye $a$, so that the worker still hangs on the rope, which is strong enough to carry his weight.

On ladders the ropes are wound into loops in a similar manner around the rungs of the ladder, or the spring hooks hooked into their corresponding rings $f$, according to whether a tight drawing or loose loop is required.

In Fig. 2 the great freedom of movement is shown, the worker having in this instance turned half round, which is easily possible, owing to the two belts running the one within the other. With regard to safety against falling, in the event of slipping off the rungs, that which has already been said, also applies in this instance.

The running belt ends of the light construction, shown in Fig. 4, are wrapped around the ladder rungs exactly like the ropes, after the belt has been put on, and the loops are closed with the aid of the buckles $m$ engaging in the holes $n$.

I claim:—

1. A safety belt, comprising in combination two belts connected together, but easily shiftable the one relative to the other, rings on the two ends of one of said belts, a rope in each of said rings adapted to be wrapped round a telegraph pole or ladder rung and a spring hook on the end of each rope adapted to be hooked over said rope and to close the loop formed by said rope around the telegraph pole or ladder rung.

2. A safety belt, comprising in combination two belts connected together but easily shiftable the one relative to the other, and buckles near each end of one of said belts adapted to close a loop formed by said belt around a telegraph pole or a rung of a ladder.

In testimony whereof I affix my signature.

OTTO BECKER.